United States Patent
Choi et al.

(10) Patent No.: US 7,283,354 B2
(45) Date of Patent: Oct. 16, 2007

(54) MONITOR APPARATUS

(75) Inventors: Hyun-yong Choi, Chuncheon-si (KR); Hee-jun Kim, Suwon-si (KR); Man-yeob Lee, Suwon-si (KR); Dong-hyug Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 11/037,146

(22) Filed: Jan. 19, 2005

(65) Prior Publication Data

US 2005/0254203 A1    Nov. 17, 2005

(30) Foreign Application Priority Data

May 13, 2004    (KR)    ............... 10-2004-0033858

(51) Int. Cl.
    *G06F 1/16*    (2006.01)
(52) U.S. Cl. ...................................... 361/681
(58) Field of Classification Search ................. 361/681
    See application file for complete search history.

(56) References Cited

U.S. PATENT DOCUMENTS 6,822,857 B2 *  11/2004  Jung et al. .................. 361/681

FOREIGN PATENT DOCUMENTS

| JP | 15-280533 A | 10/2003 |
|---|---|---|
| JP | 16-56802 | 2/2004 |
| KR | 20-01918-5 | 5/2000 |
| KR | 2003-62893 | 7/2003 |
| KR | 20-0326991 | 9/2003 |
| KR | 20-0326992 | 9/2003 |
| KR | 20-0341412 | 1/2004 |

OTHER PUBLICATIONS

-International Search Report issued on Apr. 25, 2005 and listed 2 references.

* cited by examiner

*Primary Examiner*—Yean-Hsi Chang
(74) *Attorney, Agent, or Firm*—Stanzione & Kim, LLP

(57) ABSTRACT

A monitor apparatus including a monitor main body to display a picture, and a base supporting the monitor main body, the monitor apparatus including: a link provided between the monitor main body and the base; a monitor hinge interposed between the monitor main body and the link and rotatably supporting the monitor main body to the base; a base hinge having a base bracket interposed between the base and the link and rotatably supporting the link to the base; a protruding portion formed in one of the base bracket and the link; and a rotation restricting portion provided in the other one of the base bracket and the link, elastically contacting the protruding portion, and preventing the link from rotation so as to keep the monitor main body rotated in a position parallel with the base. With this configuration, a link of a monitor is prevented from being rotated due to the weight thereof and the link when the monitor is in parallel with a base.

24 Claims, 9 Drawing Sheets

MONITOR APPARATUS

CROSS-REFERENCE TO RELATED APPLICATIONS

This application claims the benefit of Korean Patent Application No. 2004-33858, filed May 13, 2004, in the Korean Intellectual Property Office, the disclosure of which is incorporated herein by reference.

BACKGROUND OF THE INVENTION

1. Field of the Invention

The present general inventive concept relates to a monitor apparatus, and more particularly, to a monitor apparatus in which a monitor main body can be disposed in parallel with a base.

2. Description of the Related Art

Recently, there is being widely used a display panel such as a liquid crystal display (LCD) which has a thickness relatively thin with respect to its displaying area.

As shown in FIG. 1, a conventional monitor apparatus 101 comprises a monitor main body 110; a base 120 supporting the monitor main body 110; a link 130 connecting the base 120 and the monitor main body 110; a monitor hinge 140 interposed between the monitor main body 110 and the link 130 and supporting the monitor main body 110 to be rotated with respect to a transverse axis of the link 130; and a base hinge 150 interposed between the base 120 and the link 130 and supporting the link 130 to be rotated about the base 120.

Such a conventional monitor apparatus 101 can be seated on an installation surface such as a table in a state that the monitor main body 110 stands on the base 120, and can be mounted to a wall 190 in a state that the monitor main body 110 is disposed approximately parallel with the base 120, as shown in FIG. 1. As shown in FIG. 1, when the monitor apparatus 101 is mounted to the wall 190, a mounting bracket 180 is additionally provided to mount the base 120 to the wall 190.

However, in the case where the conventional monitor apparatus 101 is mounted to the wall 190, it is hard to keep an initial state of the monitor main body 110 being parallel with the base 120 due to the weight of the monitor main body 110 and the link 130, and thus the monitor main body 110 is likely to be rotated expansively and downwardly over time. Further, as the monitor main body 110 moves away from the base 120, the conventional monitor apparatus 101 occupies much space.

SUMMARY OF THE INVENTION

Accordingly, it is an aspect of the present general inventive concept to provide a monitor apparatus in which a link is prevented from being rotated due to the weight of a monitor main body and the link itself when the monitor main body is in parallel with a base.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a monitor apparatus comprising a monitor main body to display a picture, and a base supporting the monitor main body, the monitor apparatus comprising: a link provided between the monitor main body and the base; a monitor hinge interposed between the monitor main body and the link and rotatably supporting the monitor main body to the base; a base hinge having a base bracket interposed between the base and the link and rotatably supporting the link to the base; a protruding portion formed in one of the base bracket and the link; and a rotation restricting portion provided in the other one of the base bracket and the link, elastically contacting the protruded portion and preventing the link from rotation so as to keep the monitor main body rotated in parallel with the base.

According to an aspect of the present general inventive concept, the rotating restricting portion is accommodated in a rotation restricting accommodating part formed in the base bracket, and the rotation restricting accommodating part accommodates therein a spring elastically supporting the rotation restricting portion, and a shaft pin passing through and cooperating with the rotation restricting portion.

According to an aspect of the present general inventive concept, the protruding portion comprises: a first stopping portion contacting the rotation restricting portion when the link approaches the base; a projection protruding from the first stopping portion and pressing the rotation restricting portion; and a second stopping portion contacting the rotation restricting portion to keep the link in parallel with the base after the projection goes over the rotation restricting portion by an external force.

According to an aspect of the present general inventive concept, the base is capable of being mounted to an installation wall, the monitor apparatus further comprising a mounting bracket provided between the base and the installation wall and formed with a coupling hole to mount the base onto the installation wall.

According to an aspect of the present general inventive concept, the mounting bracket comprises a first bracket formed with the coupling hole to be mounted onto the installation wall, and a second bracket detachably provided with the first bracket and formed with a through hole to be coupled with the base.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
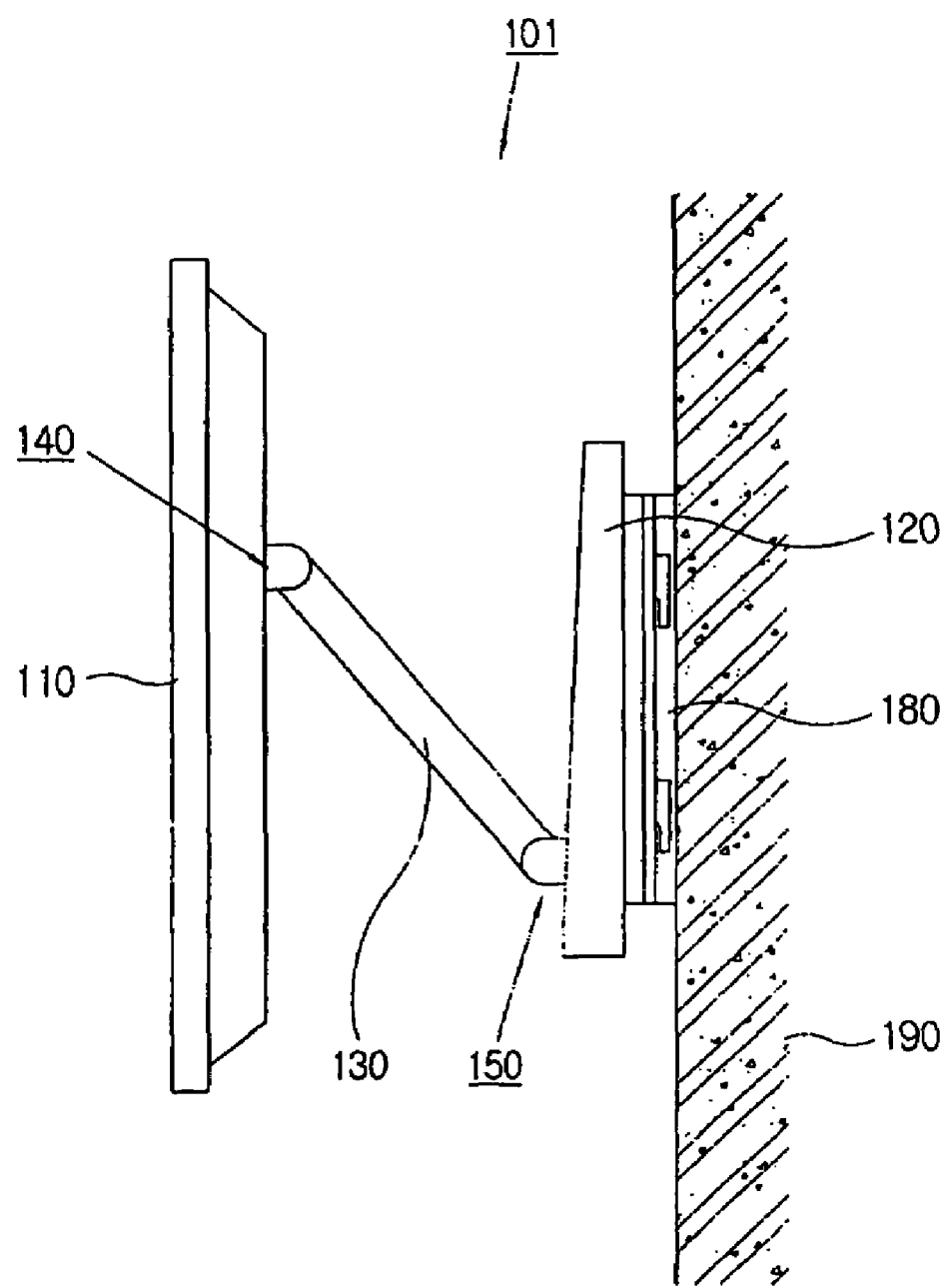
FIG. 1 is a side view illustrating a conventional monitor apparatus mounted to a wall.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a monitor apparatus comprising a thin display panel such as an LCD or a plasma display panel (PDP) will be described.

Figure 2:
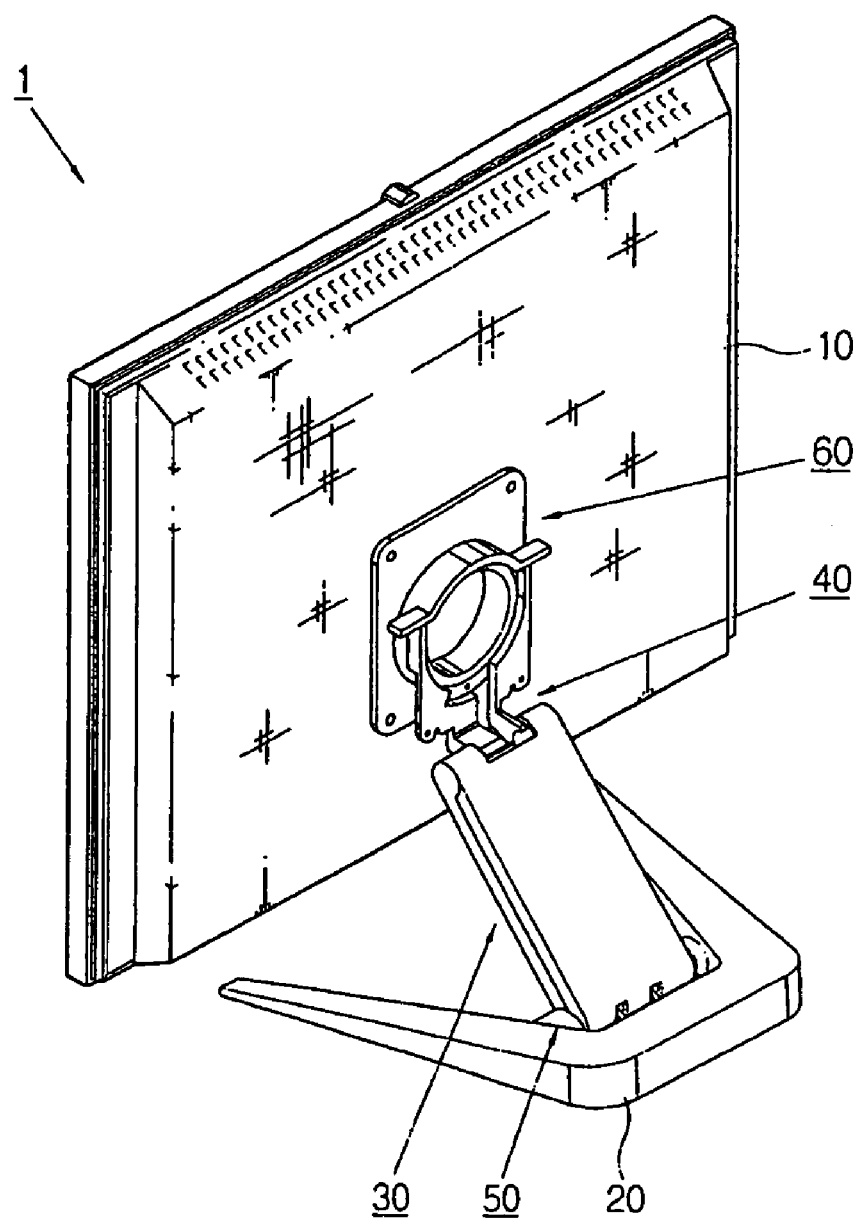
FIG. 2 is a rear perspective view of a monitor apparatus according to an embodiment of the present general inventive concept.
Figure 3:
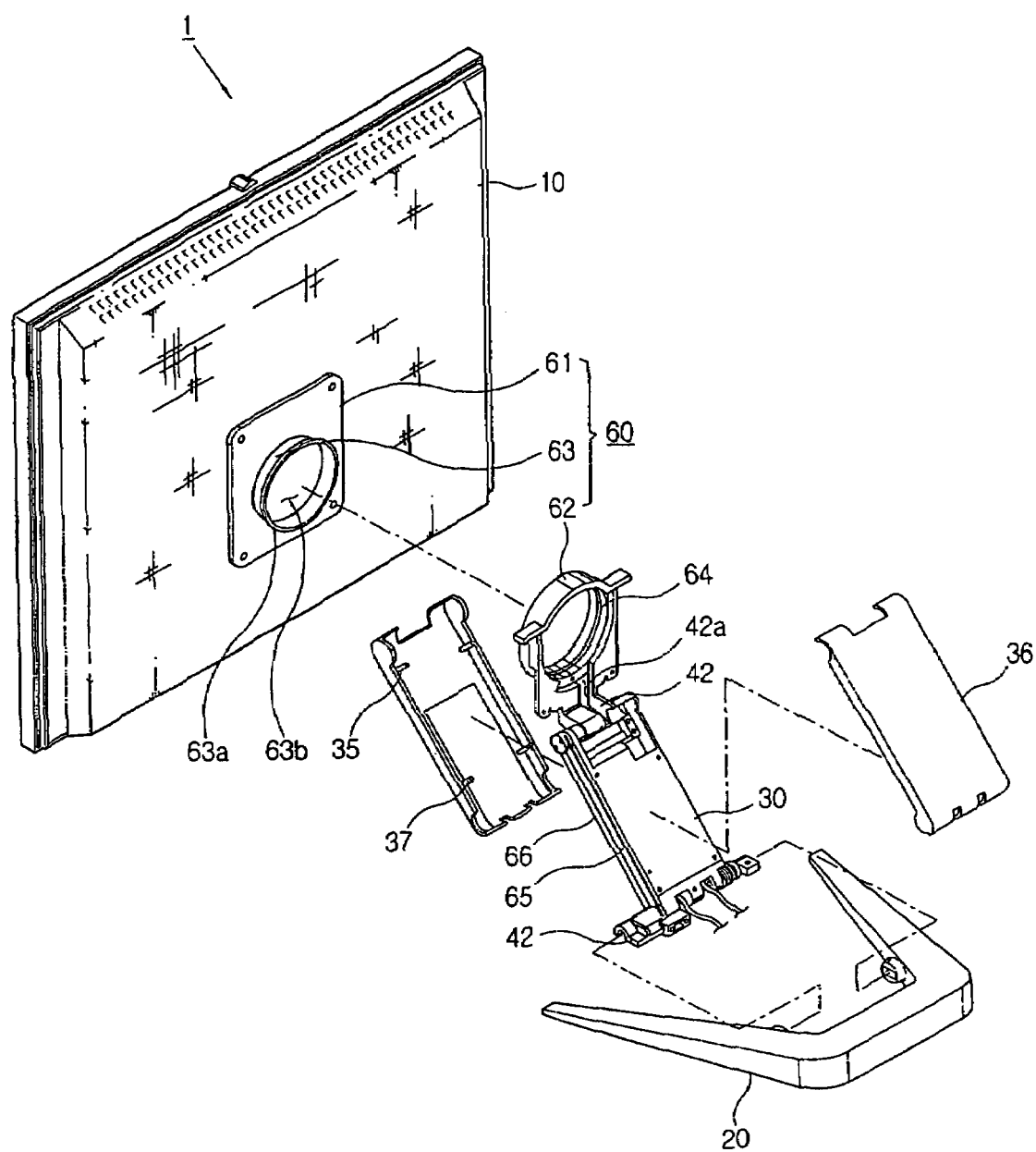
FIG. 3 is an exploded perspective view of the monitor apparatus of FIG. 2.
Figure 4:
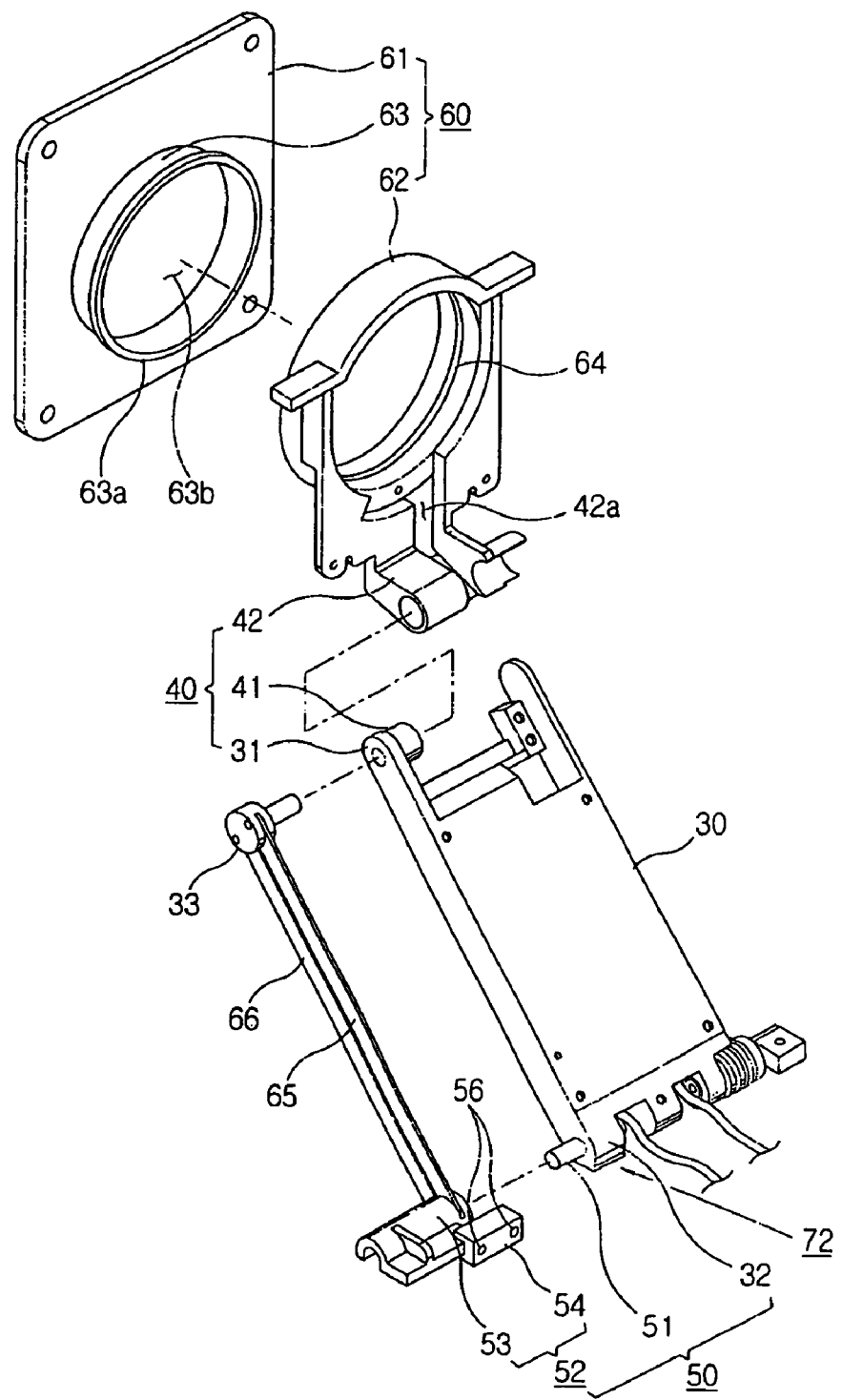
FIG. 4 is a partial exploded perspective view of the monitor apparatus of FIG. 2.

As shown in FIGS. 2 through 4, a monitor apparatus 1 according to an embodiment of the present invention comprises a monitor main body 10 to display a picture; a base 20 supporting the monitor main body 10 to be seated on an installation surface; a link 30 provided between the monitor main body 10 and the base 20; a monitor hinge 40 interposed between the monitor main body 10 and the link 30 and supporting the monitor main body 10 to be rotated about the base 20; and a base hinge 50 having a base bracket 52 interposed between the base 20 and the link 30 and supporting the base 20 to be rotated about the link 30.

Further, the monitor apparatus 1 may comprise a pivoting hinge 60 connecting the monitor main body 10 with the monitor hinge 40 so as to pivot the monitor main body 10 on the monitor hinge 40 in a back and forth direction.

The monitor main body 10 employs a thin display panel such as an LCD or a PDP for displaying a picture.

The base 20 is seated on the installation surface and supports the monitor main body 10. The installation surface may include a table, a ground, a wall a ceiling or any other type of surface that supports the base 20. Further, the base 20 comprises the base bracket 52 coupled to and supporting the base hinge 50.

The link 30 can be shaped like a rectangular plate, and may comprise an upper supporting portion 31 formed with a first hinge shaft 41, and a lower supporting portion 32 formed with a second hinge shaft 51. The upper supporting portion 31 and the lower supporting portion 32 of the link 30 are coupled with a rod supporting bracket 33 and the base bracket 52, respectively. The rod supporting bracket 33 and the base bracket 52 are coupled by a first rod 65 and a second rod 66, thereby interlocking the monitor main body 10 and the base 20. Further, the link 30 may comprise a front casing 35 and a rear casing 36 to form an outer appearance.

The front casing 35 is formed with a coupling boss 37 on an inside thereof to be coupled with the rear casing 36. The rear casing 36 may be formed with a boss insertion portion (not shown) on an inside thereof to be coupled with the coupling boss 37 of the front casing 35.

Meanwhile, a rotation restricting unit is additionally provided between the base bracket 52 and the link 30 to restrict rotation of the link 30, thereby keeping a rotated state of the monitor main body 10 in parallel with the base 20.

The rotation restricting unit may comprise a protruding portion 72 protruding from the lower supporting portion 32 of the link 30, and a rotation restricting portion 71 (see FIG. 5) provided in the base bracket 52 and elastically operating against the protruding portion 72.

Figure 6:
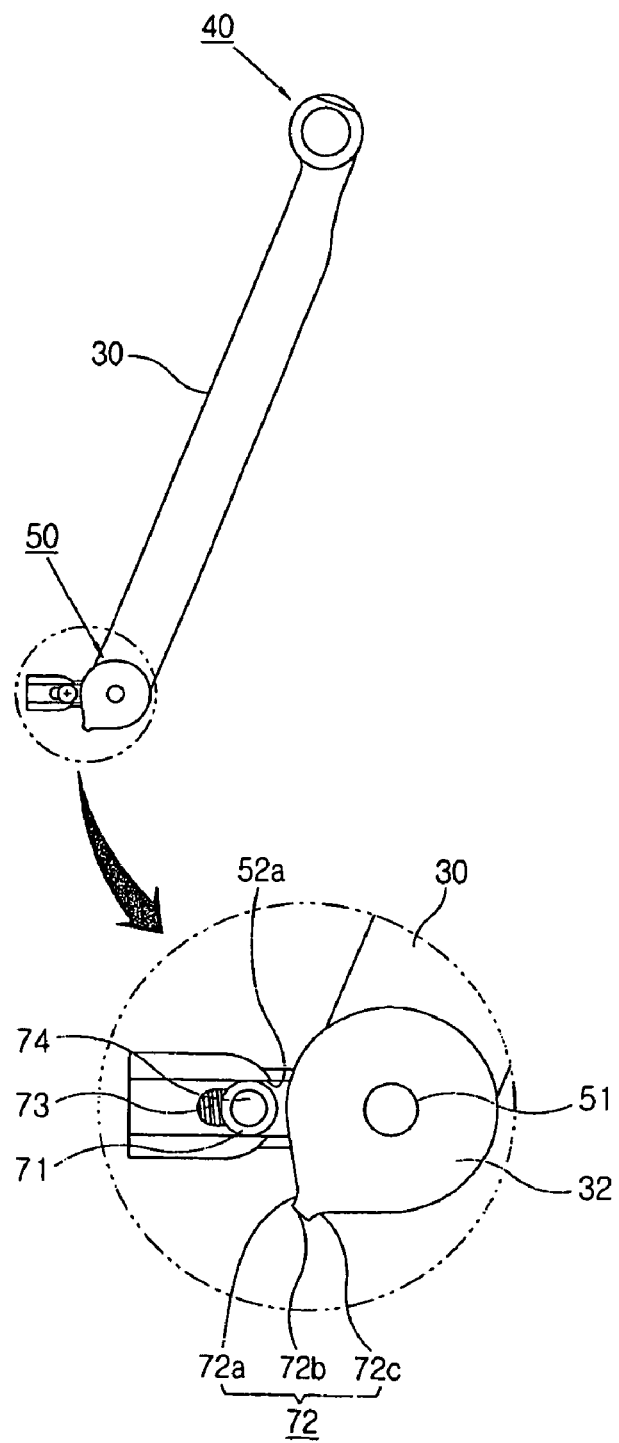
FIGS. 6 through 8 are views illustrating rotation operations of a link about a base in the monitor apparatus of FIG. 2, according to an embodiment of the present general inventive concept.
Figure 7:
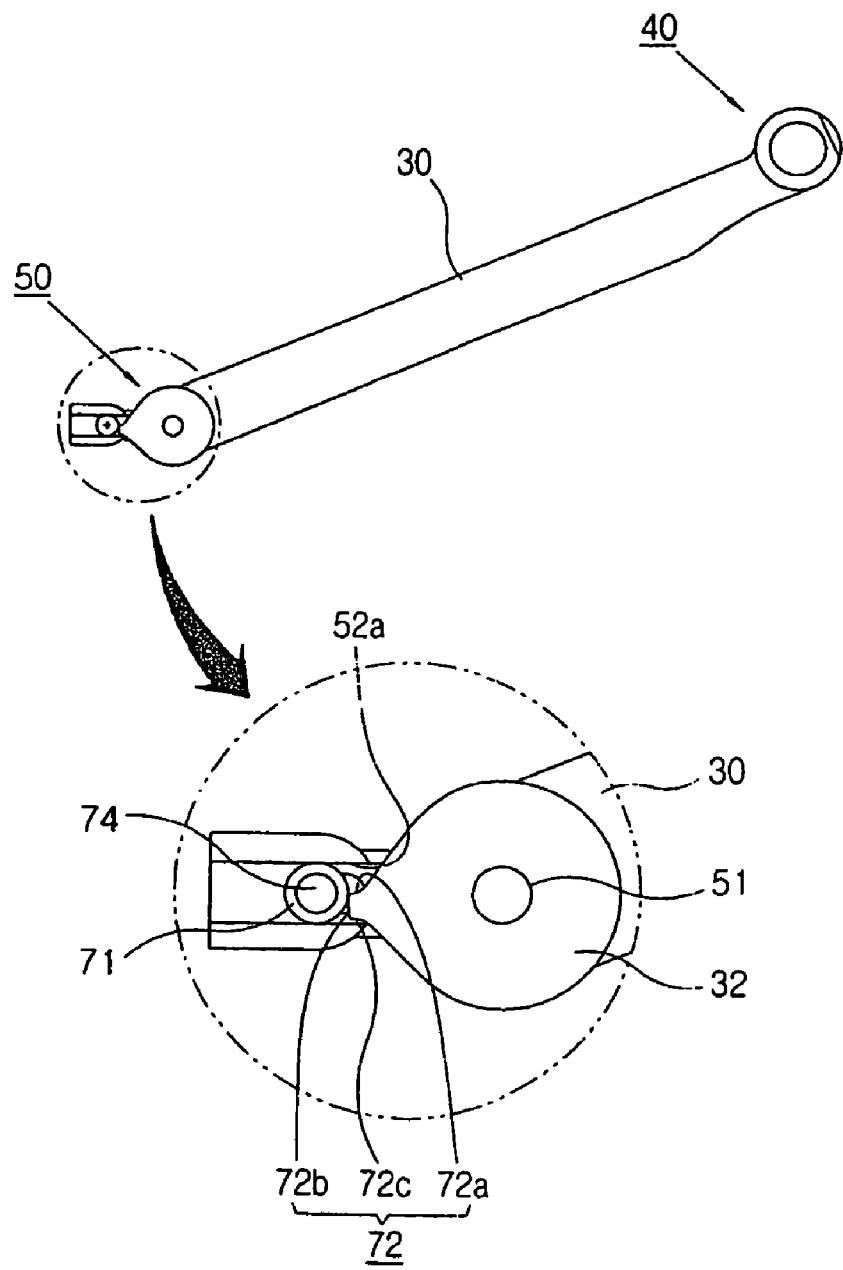
Figure 8:
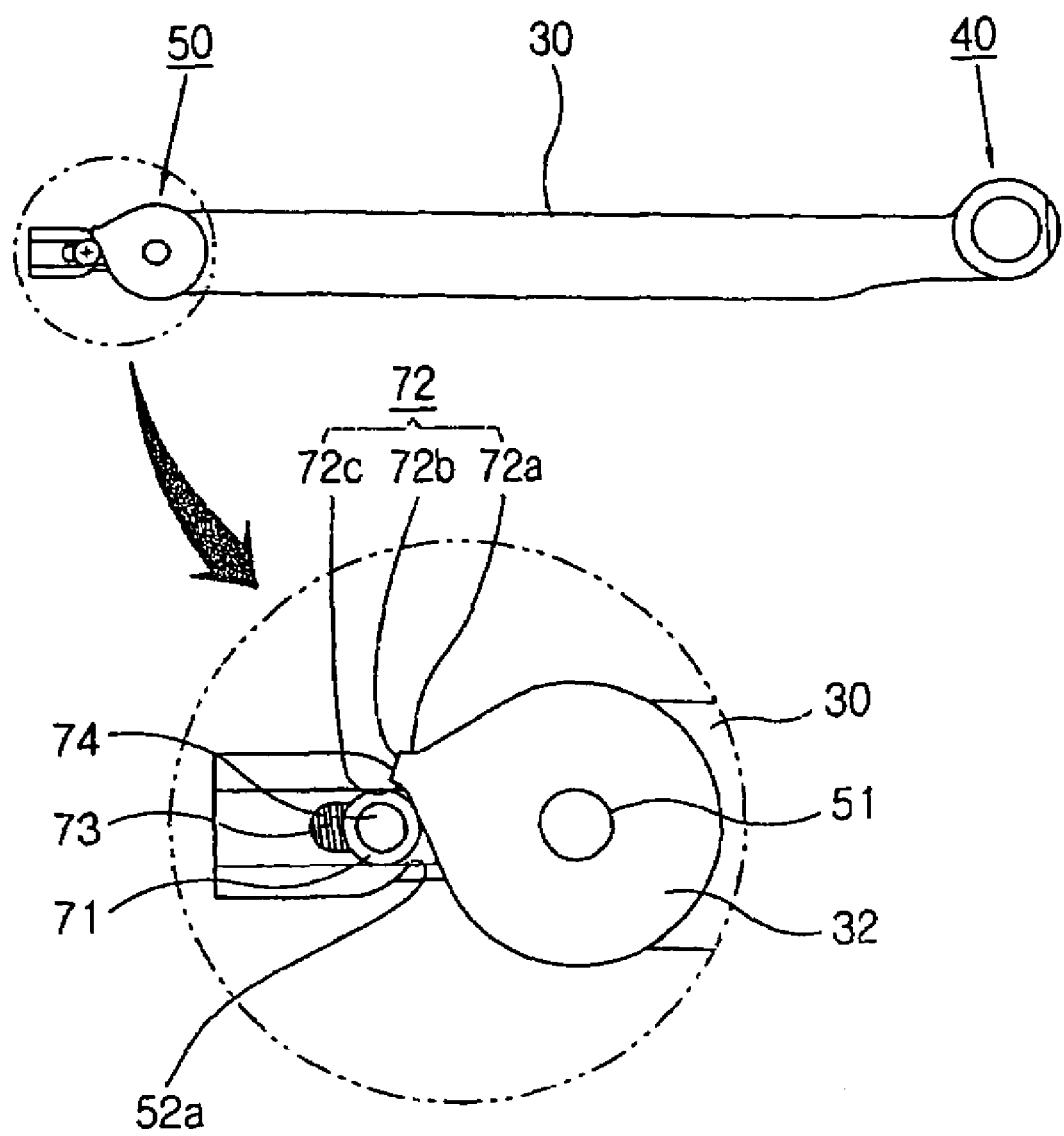

Referring to FIG. 6, the protruding portion 72 comprises a first stopping portion 72a contacting the rotation restricting portion 71 when the link 30 is rotated downwardly from a vertical state about the base 20; a projection 72b protruding from the first stopping portion 72a and making pressing contact with the rotation restricting portion 71 when rotated a predetermined amount away from the vertical state; and a second stopping portion 72c contacting the rotation restricting portion 71 so as to keep the link 30 in parallel with the base 220 after the projection 72b passes the rotation restricting portion 71 (see, for example, FIGS. 7-8).

Figure 5:
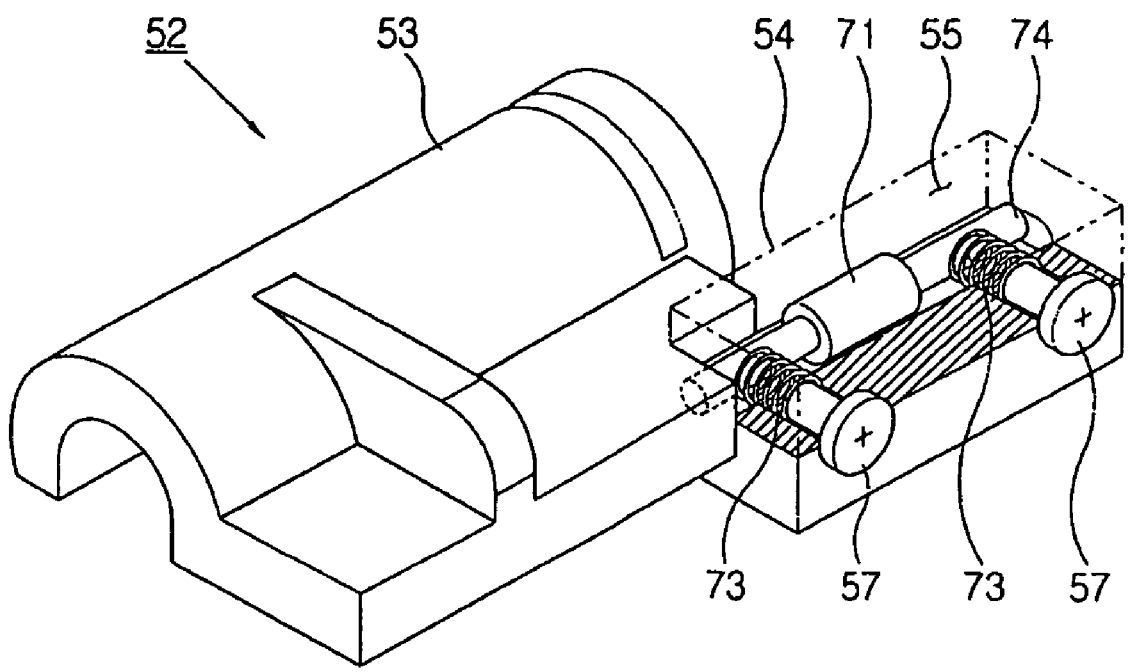
FIG. 5 is a perspective view of a base bracket of the monitor apparatus of FIG. 2, according to an embodiment of the present general inventive concept.

Referring to FIG. 5, the rotation restricting portion 71 has a cylindrical shape and is accommodated in a rotation restricting accommodating part 55 of the base bracket 52. The rotation restricting accommodating part 55 accommodates therein a spring 73 elastically supporting the rotation restricting portion 71, and a shaft pin 74 passing through and interlocking with the rotation restricting portion 71. Further, the base bracket 52 comprises an opening 52a (see FIG. 6) facing the protruding portion 72 and partially exposing the rotation restricting portion 71 therethrough, and a spring insertion portion 56 facing a back portion of the base bracket 52 and accommodating the spring 73 therein. The spring insertion portion 56 formed in the back portion of the base bracket 52 is coupled with a screw 57, wherein the screw 57 prevents the spring 73 from breaking away from the base bracket 52 and pushes the spring 73 in a direction opposite to a direction that the rotation restricting portion 71 is pressed by the protruding portion 72.

The spring 73 forms a pair and contacts the shaft pin 74, wherein a coil spring having a predetermined elasticity is preferably employed as the spring 73 to press the rotation restricting portion 71 toward a front portion of the base bracket 52. The spring 73 has elasticity enough to allow not only the first stopping portion 72a to be stopped by the rotation restricting portion 71 when the link 30 is rotated downwardly, but also the projection 72b to overcome and pass the rotation restricting portion 71 when the link 30 is further pressed. Thus, when the link 30 is pressed downwardly in the state that the rotation restricting portion 71 contacts the first stopping portion 72a, the protruding portion 72 overcomes the elasticity of the spring 73, passes the rotation restricting portion 71, which in turn contacts the second stopping portion 72c, and thereby allows the link 30 to be rotated in parallel with the base 20. At this time, the spring 73, which was compressed by the projection 72b, is restored so that the rotation restricting portion 71 is once again exposed through the opening 52a while in contact with the second stopping portion 72c. Thus, the second stopping portion 72c is stopped by the rotation restricting portion 71 so that the link 30 is prevented from being rotated when the monitor apparatus 1 is mounted to the wall, thereby keeping a folded state of the monitor main body 10 and the base 20.

Referring to FIG. 4, the monitor hinge 40 comprises the first hinge shaft 41; a main bracket 42 extending from a pivoting bracket 62 (to be described later) and coupled with a first end of the first hinge shaft 41; and the upper supporting portion 31 of the link 30 coupled with a second end of the first hinge shaft 41.

The main bracket 42 extends from the pivoting bracket 62 and is connected to the upper supporting portion 31 of the link 30, and supports the monitor main body 10 to be rotated with respect to the first hinge shaft 41. Further, the main bracket 42 is formed with a cable accommodating portion 42a in which a cable (not shown) elastically connecting the monitor main body 10 with the base 20 is accommodated.

The base hinge 50 comprises the second hinge shaft 51; the base bracket 52 coupled to the base 20 and a first end of the second hinge shaft 51; and the lower supporting portion 32 of the link 30 coupled to a second end of the second hinge shaft 51.

The base bracket 52 comprises a first region coupled with the first and second rods 65 and 66; and a second region comprising a rod supporting portion 53 coupled with the second hinge shaft 51, and a rotation restricting supporting portion 54 extending from the rod supporting portion 53 and coupled with the rotation restricting portion 71.

The rotation restricting supporting portion 54 comprises the spring insertion portions 56 at the back thereof in which the pair of springs 73 are inserted, wherein the screw 57 (FIG. 5) is coupled to the spring insertion portion 56 to prevent the spring 73 from breaking away therefrom.

The lower supporting portion 32 is provided with the protruding portion 72 having a projection shape corresponding to the rotation restricting portion 71, so that the protruding portion 72 operates against the rotation restricting portion 71 when the link 30 is rotated.

The pivoting hinge 60 is interposed between the monitor main body 10 and the main bracket 42, and allows the monitor main body 10 to be pivoted about the main bracket 42 with respect to a back and forth direction axis of the monitor main body 10. Further, the pivoting hinge 60 comprises a monitor bracket 61 coupled to the back of the monitor main body 10 and having a pivoting shaft 63; and the pivoting bracket 62 interposed between the monitor bracket 61 and the main bracket 42 and pivotally coupled with the monitor bracket 61.

The monitor bracket 61 has a first side coupled to the back of the monitor main body 10 by a screw (not shown), and a second side provided with the pivoting shaft 63 protruding therefrom in a direction away from the first side.

The pivoting bracket 62 is formed with a pivoting shaft coupling portion 64 to which the pivoting shaft 63 is pivotally coupled.

The pivoting shaft 63 may be shaped like a cylinder with the inside portion of the cylinder having a hollow area 63b, and protrudes away from the center of the monitor bracket 61. Such a hollow area 63b preferably has a size large enough to pass the cable connecting the monitor main body 10 with the base 20 therethrough. A brim of the pivoting shaft 63 is formed with a bending portion 63a bent to press an inner portion of the shaft coupling portion 64 so that the monitor bracket 61 can closely contact the pivoting bracket 62, thereby creating a rotational friction therebetween. Preferably, the pivoting shaft 63 is coupled to the pivoting bracket 62 with at least one washer (not shown). At this time, the washer provides suitable rotational friction between the monitor bracket 61 and the pivoting bracket 62.

Figure 9:
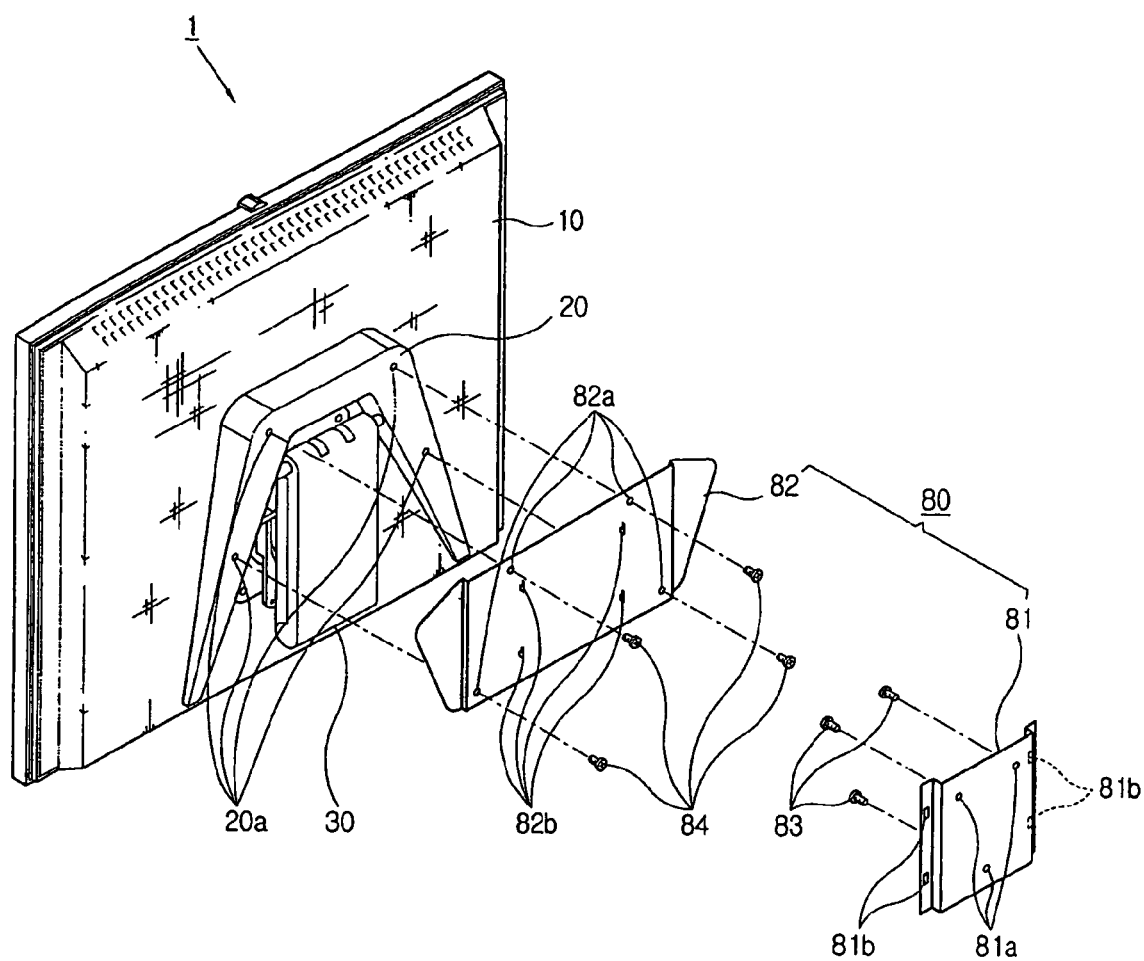
FIG. 9 is a rear exploded perspective view of a monitor apparatus mounting bracket, according to an embodiment of the present general inventive concept.

Referring to FIG. 9, the monitor apparatus 1 according to an embodiment of the present general inventive concept comprises a mounting bracket 80 to mount the base 20 to an inclined installation surface. Here, the inclined installation surface may be a wall positioned at a right angle to the ground, and a ceiling being at an angle of 180° with respect to the ground.

The mounting bracket 80 comprises a first bracket 81 mounted to the installation surface, and a second bracket 82 provided detachably from the first bracket 81 and coupled to the back of the base 20.

The first bracket 81 comprises a plurality of coupling holes 81a screw-coupled with the installation surface, and a plurality of hook holes 81b coupled with the second bracket 82.

The second bracket 82 comprises a plurality of through holes 82a screw-coupled with the rear of the base 20, and a plurality of hooks 82b corresponding to and coupled to the plurality of hook holes 81b of the first bracket 81. The rear of the base 20 is formed with a plurality of screw holes 20a corresponding to the plurality of through holes 82a. The second bracket 82 may be additionally formed with a guiding projection (not shown) to be guided to a coupling place of the base 20. The guiding projection may be inserted in a projection hole formed in the rear of the base 20.

With this configuration, operations of the monitor apparatus 1 according to an embodiment of the present general inventive concept will be described with reference to FIG. 2 and FIGS. 6 through 8.

First, the monitor main body 10 is folded in parallel with the base 20 as follows. The monitor main body 10 is pressed downwardly from a rotated state shown in FIG. 2. Then, the protruding portion 72 provided on the link 30 is stopped by the rotation restricting portion 71 provided in the base bracket 52 before the lower portion of the monitor main body 10 contacts the base 20. At this time, the first stopping portion 72a of the protruding portion 72 is in contact with the rotation restricting portion 71, thereby preventing the lower portion of the monitor main body 10 from colliding with the base 20 when the monitor main body 10 is adjusted in height. Thereafter, when the monitor main body 10 is pressed backwardly until the monitor main body 10 is rotated to a position parallel with the link 30, and then is further pressed downwardly, the spring 73 is compressed toward the back of the rotation restricting accommodating part 55 (see FIG. 5), and therefore the projection 72b passes the rotation restricting portion 71. Thus, the monitor main body 10 is folded in parallel with the base 20, and then the spring 73 is restored from the compressed state. At this time, the second stopping portion 72c of the protruding portion 72 is in contact with the rotation restricting portion 71, and thus is prevented from breaking away from the rotation restricting portion 71, thereby keeping the monitor main body 10 in parallel with the base 20.

Further, in the state that the monitor main body 10 is in parallel with the base 20, a process of mounting the monitor main body 10 to the wall will be described with reference to FIG. 9.

First, the screws 83 pass through the respective coupling holes 81a of the first bracket 81 and mount the first bracket 81 onto the wall. Then, second screws 84 pass through the respective through holes 82a of the second bracket 82 and screw-coupled to the screw hole 20a of the base 20, thereby coupling the second bracket 82 to the base 20. At this time, a user can easily align the through holes 82a of the second bracket 82 with the screw holes 20a of the base 20 by the guiding projection of the second bracket 82 and the projection hole of the base 20. Further, the hooks 82b of the second bracket 82 are coupled to the hook holes 81b of the second bracket 81, so that the first bracket 81 and the second bracket 82 are coupled, thereby securely mounting the monitor apparatus 1 to the wall.

As described above, the present invention provides a monitor apparatus in which a monitor main body can be folded in parallel with a base, and a link is stopped by a protruding portion and a rotation restricting portion to keep the monitor main body in parallel with the base, thereby minimizing occupying space of the monitor apparatus.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A monitor apparatus comprising a monitor main body to display a picture, and a base supporting the monitor main body, the monitor apparatus comprising:

a link provided between the monitor main body and the base;

a monitor hinge interposed between the monitor main body and the link and rotatably supporting the monitor main body to the base;

a base hinge having a base bracket interposed between the base and the link and rotatably supporting the link to the base;

a protruding portion formed in one of the base bracket and the link; and a rotation restricting portion provided in the other one of the base bracket and the link to elastically contact the protruding portion, and prevent the link from rotation so as to keep the monitor main body rotated in a position parallel with the base.

2. The monitor apparatus according to claim 1, wherein the rotation restricting portion is accommodated in a rotation restricting accommodating part formed in the base bracket, and the rotation restricting accommodating part accommodates therein a spring elastically supporting the rotation restricting portion, and a shaft pin passing through and cooperating with the rotation restricting portion.

3. The monitor apparatus according to claim 2, wherein the protruding portion comprises a first stopping portion to contact the rotation restricting portion when the link rotates to approach the base; a projection protruding from the first stopping portion to press the rotation restricting portion; and a second stopping portion to contact the rotation restricting portion to keep the link in parallel with the base after the projection is passed over by the rotation restricting portion due to an external force.

4. The monitor apparatus according to claim 1, further comprising a mounting bracket provided between the base and an installation wall and formed with a coupling hole to mount the base onto the installation wall.

5. The monitor apparatus according to claim 4, wherein the mounting bracket comprises a first bracket formed with the coupling hole to be mounted onto the installation wall, and a second bracket detachably provided with the first bracket and formed with a through hole to be coupled with the base.

6. The monitor apparatus according to claim 1, wherein the monitor hinge comprises:

a monitor bracket having a first surface connected to the monitor main body and a second surface including a pivoting shaft extending outward in a direction opposite to the first surface;

a pivoting shaft coupling portion that couples to the pivoting shaft such that the pivoting shaft pivots within the pivoting shaft coupling portion; and a main bracket extending from the pivoting shaft coupling portion to rotatably engage with the link.

7. The monitor apparatus according to claim 6, wherein the base hinge further comprises a hinge shaft extending from the link and rotationally engaging with an inner portion of the base bracket.

8. A monitor apparatus comprising:

a main body including a display;

a base to support the main body while being fixed to a surface;

a link pivotally connected at a first end to the main body and pivotally connected at a second end to the base, the link having a base bracket connected to the base and extending from the second end thereof to provide a restrictive rotating connection between the link and the base such that the main body can be maintained in a vertical position when the surface in which the base is fixed is a horizontal surface and the main body can be maintained in a vertical position when the surface in which the base is fixed is a vertical surface; and a protruding portion protruding along a bottom portion of the link to elastically contact a portion of the base bracket and cause the restricting rotation movement of the link upon elastic contact with the portion of the base bracket.

9. The monitor apparatus according to claim 8, wherein the link further comprises:

a hinge shaft extending outward from and perpendicular to the second end of the link to engage with the base bracket.

10. The monitor apparatus according to claim 9, wherein the base bracket further comprises:

a rod supporting portion to rotatably support the hinge shaft; and a rotation restricting supporting portion that applies a force to the protruding portion during predetermined angles of rotation of the link with respect to the base bracket to restrict movement of the link.

11. The monitor apparatus according to claim 10, wherein the rotation restricting supporting portion comprises:

a rotation restricting portion that applies force against the protruding portion to restrict movement thereof; and an elastic member to force the rotation restricting portion toward the protruding portion.

12. The monitor apparatus according to claim 11, wherein the protruding portion comprises:

a first stopping portion that engages the rotation restricting portion when the link is rotated a predetermined distance in a direction toward the base; and a second stopping portion that engages the rotation restriction portion when the link is rotated such that the first stopping portion has passed over the rotation restricting portion and the link is parallel with the base, the second stopping portion restricting the link to remain parallel with the base.

13. The monitor apparatus according to claim 11, wherein the rotation restriction supporting portion further comprises a shaft pin that extends through the rotation restricting portion at both ends, and the elastic portion comprises two springs, each spring applying a force to a respective end of the shaft pin to force the rotation restricting portion toward the protruding portion.

14. A monitor apparatus comprising:

a main body including a display;

a base to support the main body with respect to a resting surface;

a link connected at a first end to the main body and including a base hinge at a second end rotationally connected to the base such that the main body can be maintained in a vertical position when the base is installed on either a horizontal resting surface or a vertical resting surface; and a mounting bracket to fix the base to the vertical resting surface having a first bracket including:

plural through holes in which screws extend through to fasten the first bracket to the vertical resting surface, and plural hook holes; and a second bracket including:

plural through holes in which screws extend through to fasten the second bracket to the base, and plural hooks to engage with the hook holes to connect the first bracket with the second bracket.

15. A monitor apparatus comprising:
a main body including a display;
a base to support the main body with respect to a resting surface; and
a link connected at a first end to the main body and including a base hinge at a second end rotationally connected to the base such that the main body can be maintained in a vertical position when the base is installed on either a horizontal resting surface or a vertical resting surface;
wherein the base hinge includes:
a hinge shaft extending from the second end of the link;
a base bracket connected to the base and including:
a rod supporting portion to receive the hinge shaft therein, and
a rotation restriction supporting portion to elastically contact an end portion of the second end of the link adjacent to the hinge shaft to frictionally restrict rotational movement of the hinge shaft within the rod supporting portion and rotational movement of the link with respect to the base.

16. The monitor apparatus of claim 15, wherein the end portion of the second end of the link includes a protruding portion, and the rotation restriction supporting portion includes a rotation restricting portion therein and exposed to frictionally engage with the protruding portion to frictionally restrict rotational movement of the hinge shaft within the rod supporting portion and rotational movement of the link with respect to the base.

17. A monitor apparatus comprising:
a link pivotally connecting a base to a main body of the monitor and including a protruding portion, the protruding portion including:
a first stopping portion that engages a rotation restricting portion when the link is rotated a predetermined distance in a direction toward the base; and
a second stopping portion that engages the rotation restriction portion when the link is rotated such that the first stopping portion has passed over the rotation restricting portion and the link is parallel with the base, the second stopping portion restricting the link to remain parallel with the base.

18. A monitor apparatus comprising:
a monitor main body including a display;
a base to support the monitor main body;
a link connecting the monitor main body to the base and including a rotatable protruding portion; and
a hinge portion including a restriction portion to resiliently engage the protruding portion,
wherein upon engagement of the restriction portion and the protruding portion, the link is locked in a desired position.

19. The monitor apparatus of claim 18 wherein the restriction portion engages and disengages the protruding portion upon rotation of said protruding portion.

20. The monitor apparatus of claim 18 wherein the restriction portion is biased outwardly by a spring that is compressed upon rotation of said protruding portion in a direction.

21. The monitor apparatus of claim 18 wherein the restriction portion stops rotation of the protruding portion when the protruding portion engages the restriction portion while rotating with a first force, and the restriction portion does not stop rotation of the protruding portion when the protruding portion engages the restriction portion while rotating with a second force.

22. The monitor apparatus of claim 21 wherein the second force is greater than the first force.

23. The monitor apparatus of claim 18 wherein the desired position situates the link such that the monitor main body is in a vertical position when the base is fixed to a horizontal surface.

24. The monitor apparatus of claim 18 wherein the desired position situates the link such that the monitor main body is in a vertical position when the base is fixed to a vertical surface.

* * * * *